(No Model.)
J. P. PARKER.
SOIL PULVERIZER.
No. 442,538. Patented Dec. 9, 1890.
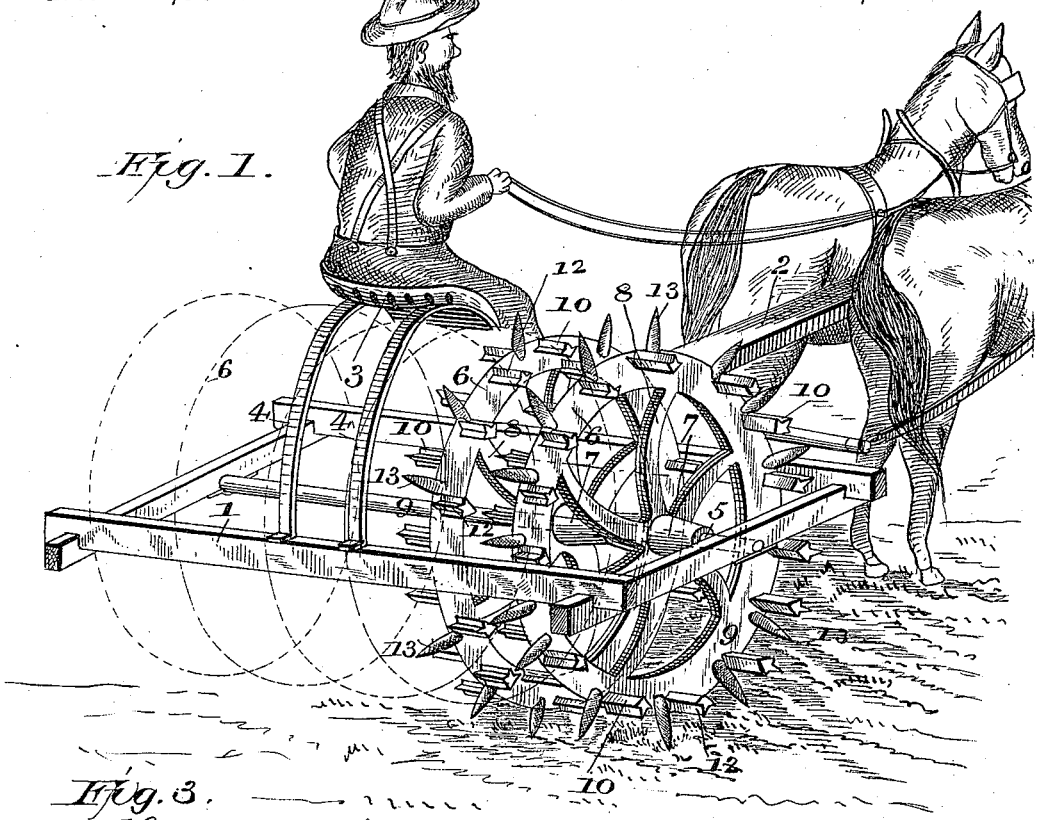
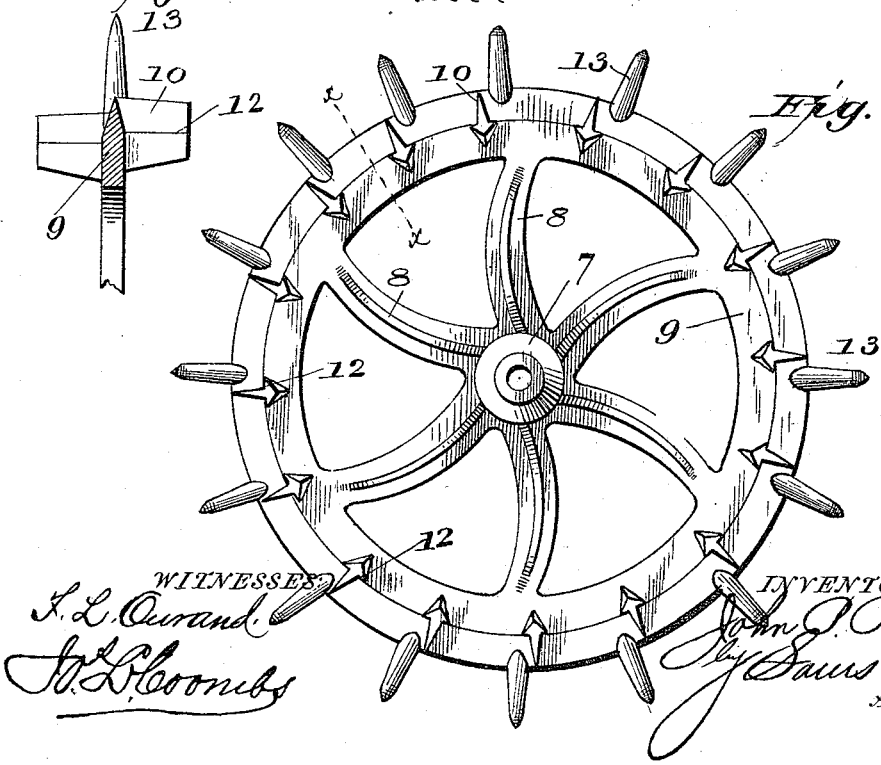
WITNESSES:
F. L. Ourand
W. L. Coombs
INVENTOR:
John P. Parker
by James Daggett
Attorney

UNITED STATES PATENT OFFICE.

JOHN PERCIAL PARKER, OF RIPLEY, OHIO.

SOIL-PULVERIZER.

SPECIFICATION forming part of Letters Patent No. 442,538, dated December 9, 1890.

Application filed August 7, 1890. Serial No. 361,246. (No model.)

*To all whom it may concern:*

Be it known that I, JOHN PERCIAL PARKER, a citizen of the United States, and a resident of Ripley, in the county of Brown and State of Ohio, have invented certain new and useful Improvements in Soil-Pulverizers; and I do hereby declare that the following is a full, clear, and exact description of the invention, which will enable others skilled in the art to which it appertains to make and use the same, reference being had to the accompanying drawings, which form a part of this specification.

My invention relates to improvements in apparatus for cutting up and pulverizing soil for agricultural purposes of that class known as "revolving" or "rotary" pulverizers.

Heretofore a rotary soil-pulverizer has been constructed which comprised a series of disks mounted upon a shaft or axle revolving in a suitable frame, said disks being provided with a series of lateral projections near their peripheries, whereby the soil was crushed and pulverized. This construction of apparatus was very effective in use; but still there were disadvantages which my invention is intended to obviate.

The object of the invention is to provide a simple and economical apparatus of the above description which will effectually and rapidly crush clods, cut up cornstalks and other like objects, and pulverize the soil so as to leave it in the best possible condition for agricultural purposes.

The invention consists in the novel construction and combination of parts, hereinafter fully described, and specifically pointed out in the claim.

In the accompanying drawings, Figure 1 is a perspective view of an apparatus constructed in accordance with my invention. Fig. 2 is a side elevation of one of the cutting, crushing, and pulverizing disks or wheels. Fig. 3 is a section on line *x x* of Fig. 2.

In the said drawings the reference-numeral 1 designates a rectangular frame, which is provided with a tongue 2, to which the draft-animals are attached.

3 designates the driver's seat, carried by the springs 4, secured to the front and rear beams of the frame 1. Mounted in the side bars of frame 1 is a shaft or axle 5, which is capable of rotating freely therein. Secured to this shaft are the crushing and pulverizing disks or wheels 6. These disks each consist of a central hub 7, which is secured to shaft 5, the radial arms 8, and rims 9. Projecting laterally from each side of the rims 9 are a series of ogee-shaped projections 10, having outwardly-extending blades 12. The rims are also provided with peripheral projections or teeth 13. The disks or wheels are preferably cast of metal, with the projections and blades and teeth integral therewith; but they may be made in any other manner found convenient or desirable. The projections 10 and teeth 13 are also preferably arranged equidistant apart and alternating with each other, as shown.

The operation will be readily understood. As the apparatus is drawn across a field, the disks will rotate and the blades and teeth will thoroughly and effectually cut up, crush, and pulverize the soil so as to fit it for agricultural purposes.

It will be seen that the outer edge of the rim between the teeth forms a cutter as well as the outer edges of the projections, which are both cutters and crushers.

Having thus described my invention, what I claim is—

In an apparatus for crushing and pulverizing soil and cutting cornstalks and other obstacles, the combination, with a frame and a revolving shaft or axle, of a series of disks or wheels mounted upon the shaft, the outer edges of which form cutters, and the laterally-extending ogee-shaped projections having outwardly-extending blade and peripheral projections or teeth, substantially as described.

In testimony that I claim the foregoing as my own I have hereunto affixed my signature in presence of two witnesses.

JOHN PERCIAL PARKER.

Witnesses:
MARSHALL CREEKBAUM,
J. M. CRISWELL.